Figure 1:
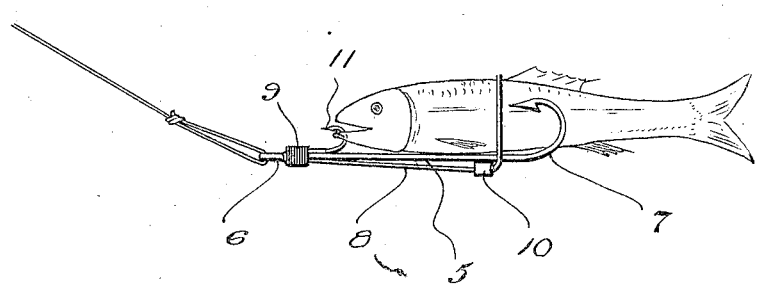

Jan. 4, 1927.

J. J. LEU

FISHHOOK

Filed March 27, 1926

1,613,113

Inventor

J. J. Leu

By Clarence A. O'Brien

Attorney

Patented Jan. 4, 1927.

1,613,113

UNITED STATES PATENT OFFICE.

JACOB J. LEU, OF BELMOND, IOWA.

FISHHOOK.

Application filed March 27, 1926. Serial No. 97,930.

The present invention relates to a fish hook and has for its prime object to provide a structure for holding a minnow or other live bait without killing the bait, yet preventing the escape thereof and a structure which is thoroughly reliable in insuring a surer catch when struck by all game fish.

Another important object of the invention resides in the provision of a simple structure which may be manufactured at a low cost, and which is strong and durable, easy to manipulate, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawing:—

Figure 2:
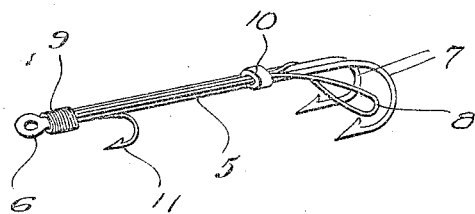

Figure 1 is a side elevation of the improved hook, showing a minnow engaged thereon, and Fig. 2, is a detail perspective view of the improved hook.

Referring to the drawing in detail, it will be seen that the numeral 5 denotes a shank which terminates at one end in an eye 6 and at its other end in a pair of hooks 7, the planes of which diverge outwardly from each other.

A string 8 preferably cat gut or other suitable strong material has its ends tied or otherwise fixed to the shank adjacent the eye 6 as is indicated at 9. A sleeve 10 is slidable over the string 8 so that the intermediate or looped end portion thereof may be engaged about a minnow and tightened as is indicated to advantage in Fig. 1. A relatively small hook 11 is attached to the shank 5 adjacent the eye 6, adapted to pass through the lower jaw of the minnow.

It will thus be seen that a minnow on this device will remain alive and be more attractive bait for fish than in the usual structures, and furthermore when the minnow is swallowed by a fish, the hooks 7 insure a positive catch.

It is thought that the construction, operation, and advantages of this invention will now be readily appreciated by those skilled in this art without a more detailed description thereof. The present embodiment of the invention has been disclosed in detail, since in actual practice, it attains the features of advantage enumerated as desirable in the statement of the invention and the above description.

It will be aparent that changes in the details of construction may be resorted to without departing from the spirit or scope of the invention, as hereinafter claimed, or sacrificing any of its advantages.

Having thus described my invention, what I claim as new is:—

1. A device of the class described including a shank, a pair of hooks on the shank at one end and diverging outwardly from each other, an eye formed on the other end of the shank, a third hook attached to the shank adjacent said eye, a string having its ends fixed to the shank adjacent the eye, and a sleeve slidable over the string.

2. A device of the class described including a shank having a hook at one end, a string, means for attaching the ends of the string to the shank adjacent the other end thereof, a sleeve slidable over the string, and a second hook fixed to the shank adjacent said other end thereof.

In testimony whereof I affix my signature.

JACOB J. LEU.